US009884305B1

(12) United States Patent
Tseng et al.

(10) Patent No.: US 9,884,305 B1
(45) Date of Patent: Feb. 6, 2018

(54) HYDROGEN-GENERATING DEVICE (71) Applicant: National Tsing Hua University, Hsinchu (TW)

(72) Inventors: Fan-Gang Tseng, Taipei (TW); Chin Pan, Taipei (TW); Hsueh-Sheng Wang, Taichung (TW); Shih-Yi Fu, Hsinchu County (TW); Miao-Hua Tu, Kaohsiung (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 15/401,828

(22) Filed: Jan. 9, 2017

(30) Foreign Application Priority Data

Oct. 28, 2016 (TW) .............................. 105134968 A (51) Int. Cl.
*B01J 19/00* (2006.01)
*H01M 8/0612* (2016.01)

(52) U.S. Cl.
CPC ....... *B01J 19/0093* (2013.01); *H01M 8/0618* (2013.01); *B01J 2219/0086* (2013.01);
(Continued)

(58) Field of Classification Search
CPC .......... B01J 19/0093; B01J 2219/00783; B01J 2219/00786; B01J 2219/00835; B01J 2219/00828; B01J 2219/00855; B01J 2219/0086; B01J 2219/00873; B01J 2219/00891; H01M 8/0618
See application file for complete search history.

(56) References Cited

U.S. PATENT DOCUMENTS

| 7,563,417 B2 | 7/2009 | Gil et al. |
| 8,283,080 B2 | 10/2012 | Lee et al. |
| 9,048,470 B2 * | 6/2015 | Tseng .................. H01M 8/1009 |

FOREIGN PATENT DOCUMENTS

| CN | 1674341 | 9/2005 |
| TW | I394709 | 5/2013 |
| TW | 201415704 | 4/2014 |

OTHER PUBLICATIONS

Tsutomu Terazaki, et al., "Development of multi-layered microreactor with methanol reformer for small PEMFC," Journal of Power Sources, vol. 145, No. 2, Aug. 18, 2005, pp. 691-696.
(Continued)

*Primary Examiner* — Lessanework Seifu
(74) *Attorney, Agent, or Firm* — J.C. Patents (57) ABSTRACT

A hydrogen-generating device is provided, wherein a first substrate includes a liquid container and a first gas container at a first side thereof, and the first substrate sequentially includes a first and second liquid diffusion area and a diverging channel area from the liquid container to the first gas container. The first and second liquid diffusion areas respectively have a plurality of liquid diffusion structures, and the diverging channel area has a plurality of diverging channels. A laminate covers the first side of the first substrate and includes a liquid feed inlet connected to the liquid container. The first side of a second substrate covers the second side of the first substrate and includes a second gas container and a gas reaction channel located at the first side. A catalyst is disposed in the gas reaction channel and a heater is disposed on the second side of the second substrate.

17 Claims, 3 Drawing Sheets

(52) U.S. Cl.
CPC ............... *B01J 2219/00783* (2013.01); *B01J 2219/00835* (2013.01); *B01J 2219/00873* (2013.01); *B01J 2219/00891* (2013.01)

(56) References Cited

OTHER PUBLICATIONS

Dehuai Zeng, et al., "Fabrication and characteristics of cube-post microreactors for methanol steam reforming," Applied Energy, vol. 91, No. 1, Mar. 2012, pp. 208-213.
Taegyu Kim, "Micro methanol reformer combined with a catalytic combustor for a PEM fuel cell," International Journal of Hydrogen Energy, vol. 34, No. 16, Aug. 2009, pp. 6790-6798.
Hsueh-Sheng Wang, et al., "A low-temperature partial-oxidation-methanol micro reformer with high fuel conversion rate and hydrogen production yield," Applied Energy, vol. 138, Jan. 15, 2015, pp. 21-30.
Fu, Shih-Yi, "A Methanol Reformer Integrated with Capillary and Diffusers Based Feed Chamber", Thesis of Master, National Tsing Hua University, Aug. 2, 2016, pp. 1-16.
"Office Action of Taiwan Counterpart Application," dated Jul. 11, 2017, p. 1-p. 6.

\* cited by examiner

HYDROGEN-GENERATING DEVICE

CROSS-REFERENCE TO RELATED APPLICATION

This application claims the priority benefit of Taiwan application serial no. 105134968, filed on Oct. 28, 2016. The entirety of the above-mentioned patent application is hereby incorporated by reference herein and made a part of this specification.

BACKGROUND OF THE INVENTION

Field of the Invention

The invention relates to a hydrogen-generating device, and more particularly, to a hydrogen-generating device using, for instance, a liquid feed of methanol and hydrogen peroxide as a reactant.

Description of Related Art

Hydrogen is used as the feed in a fuel cell such as a proton exchange membrane fuel cell (PEMFC) or a phosphoric acid fuel cell (PAFC). However, the preparation and transport of hydrogen are inconvenient, and therefore hydrogen source is difficult to obtain.

A direct methanol fuel cell (DMFC) directly uses liquid methanol as the feed, and therefore the issue of difficult acquirability of the feed can be solved. In the DMFC technique development, how to increase the feed rate and increase the evaporation efficiency of the liquid feed are both important topics in improving the power generation efficiency of DMFC.

SUMMARY OF THE INVENTION

The invention provides a hydrogen-generating device that can increase the evaporation efficiency of liquid feed.

The hydrogen-generating device of the invention includes a first substrate, a first laminate, a second substrate, and a heater. The first substrate has a first side and a second side opposite to each other, and the first substrate includes a liquid container, a first gas container, a first liquid diffusion area, a second liquid diffusion area, and a diverging channel area. The liquid container is located at the first side of the first substrate and the first gas container is located at the first side of the first substrate. The first liquid diffusion area is located between the liquid container and the first gas container, wherein a plurality of first liquid diffusion structures arranged in an array is located in the first liquid diffusion area. The second liquid diffusion area is located between the first liquid diffusion area and the first gas container, wherein a plurality of second liquid diffusion structures arranged in an array is located in the second liquid diffusion area. The diverging channel area is located between the second liquid diffusion area and the first gas container, wherein a plurality of diverging channels is located in the diverging channel area, and each of the diverging channels is extended and diverged in a first direction from the liquid container to the first gas container. The first laminate covers the first side of the first substrate and the first laminate includes a liquid feed inlet passing through the first laminate, wherein the liquid feed inlet is connected to the liquid container. The second substrate has a first side and a second side opposite to each other, wherein the first side of the second substrate covers the second side of the first substrate, and the second substrate includes a second gas container and a gas reaction channel. The second gas container is located at the first side of the second substrate and connected to the first gas container. The gas reaction charnel is located at the first side of the second substrate, wherein the inlet of the gas reaction channel is connected to the second gas container, and a catalyst is disposed in the gas reaction channel.

In one embodiment of the invention, in the hydrogen-generating device, the first substrate can further include a capillary structure area. The capillary structure area is located between the liquid container and the first liquid diffusion area, wherein a plurality of channels is located in the capillary structure area and extended along the first direction.

In an embodiment of the invention, in the hydrogen-generating device, the width of each of the channels is, for instance, between 1 μm and 100 μm.

In an embodiment of the invention, in the hydrogen-generating device, the spacing between adjacent first liquid diffusion structures is, for instance, greater than or less than the spacing between adjacent second liquid diffusion structures in a second direction staggered with the first direction.

In an embodiment of the invention, in the hydrogen-generating device, the shape of the plurality of first liquid diffusion structures in the first liquid diffusion area can include v shape, circle, rectangle, or a combination thereof.

In an embodiment of the invention, in the hydrogen-generating device, the shape of the plurality of second liquid diffusion structures in the second liquid diffusion area can include v shape, circle, rectangle, or a combination thereof.

In an embodiment of the invention, in the hydrogen-generating device, the expansion angle of the diverging channels is, for instance, between 0.1° and 30°.

In an embodiment of the invention, in the hydrogen-generating device, in the first direction, the ratio of the total length of the first liquid diffusion area and the second liquid diffusion area and the length of the diverging channel area can be between 0.5 and 2.

In an embodiment of the invention, in the hydrogen-generating device, the first substrate can further include a gas-mixing tank. The gas-mixing tank is located at the second side of the first substrate, wherein the inlet of the gas-mixing tank is connected to the first gas container, and the outlet of the gas-mixing tank is connected to the second gas container.

In an embodiment of the invention, in the hydrogen-generating device, the gas-mixing tank can further include a first gas diffusion area and a second gas diffusion area. The first gas diffusion area is located between the inlet and the outlet of the gas-mixing tank, wherein a plurality of first gas diffusion structures arranged in an array is located in the first gas diffusion area. The second gas diffusion area is located between the first gas diffusion area and the outlet of the gas-mixing tank, wherein a plurality of second gas diffusion structures arranged in an array is located in the second gas diffusion area.

In an embodiment of the invention, in the hydrogen-generating device, the spacing between adjacent first gas diffusion structures is, for instance, greater than or less than the spacing between adjacent second gas diffusion structures in a fourth direction staggered with the third direction along the inlet to the outlet of the gas-mixing tank.

In an embodiment of the invention, the hydrogen-generating device can further include a second laminate. The second laminate is located between the gas-mixing tank and the second substrate, wherein the second laminate includes a gas through-hole passing through the second laminate, and the gas through-hole is connected to the second gas container.

In an embodiment of the invention, in the hydrogen-generating device, the depth of the gas reaction channel is, for instance, between 100 μm and 1000 μm.

In an embodiment of the invention, in the hydrogen-generating device, the gas reaction channel can be zigzagged and have columnar structures at the bends.

In an embodiment of the invention, in the hydrogen-generating device, the distance of the columnar structures and the sidewall of the gas reaction channel is, for instance, between 50 μm and 5000 μm.

In an embodiment of the invention, in the hydrogen-generating device, a heater can be disposed on the second side of the second substrate.

In an embodiment of the invention, the hydrogen-generating device can further include a third laminate, and the third laminate covers the heater.

Based on the above, in the hydrogen-generating device of the invention, each of the first liquid diffusion structures and each of the second liquid diffusion structures can be indirectly used as a micro heater, and therefore the heated area of the liquid feed can be increased. Therefore, the heat transfer efficiency of the heater to the liquid feed can be increased, and the evaporation efficiency of the liquid feed can be increased. Moreover, via the diverging channels, interference to the flow direction of the liquid feed due to the reverse flow of gas evaporated from the liquid feed can be prevented. Accordingly, the evaporation efficiency of the liquid feed can be further increased and methanol gas and oxygen can be effectively guided into the subsequent gas reaction channel for a hydrogen-generating reaction.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
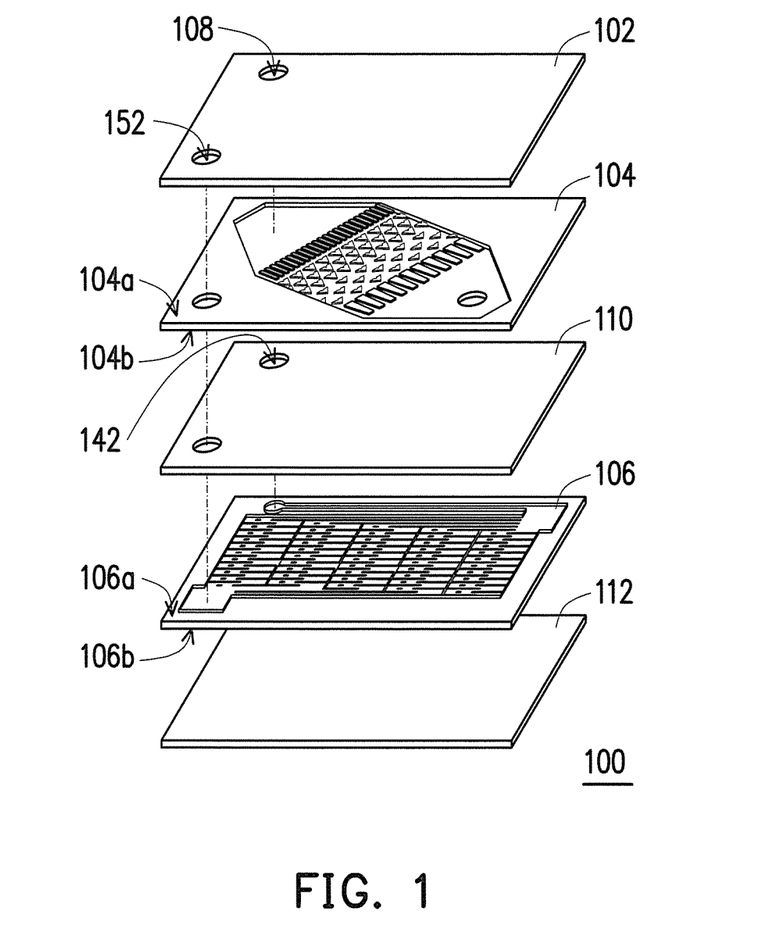
FIG. 1 is a three-dimensional exploded view of a hydrogen-generating device according to an embodiment of the invention.
Figure 2:
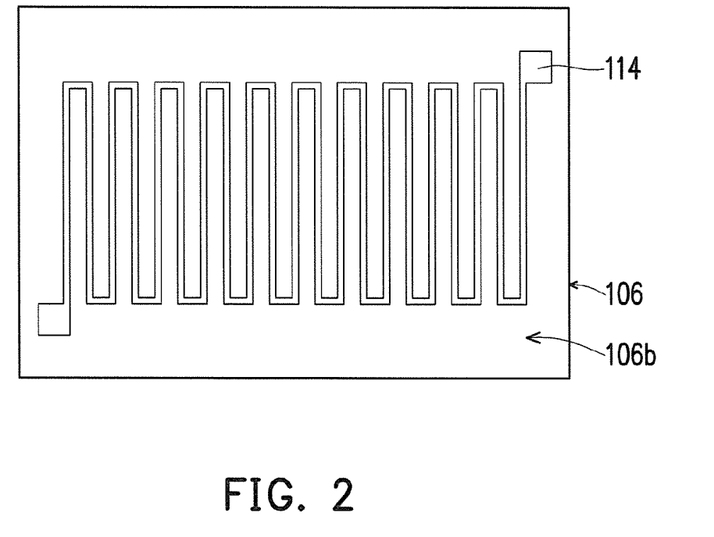
FIG. 2 is an enlarged top view of the second side of the second substrate of FIG. 1.

FIG. 1 is an exploded view of a hydrogen-generating device according to an embodiment of the invention. FIG. 2 is an enlarged top view of the second side of the second substrate of FIG. 1.

Referring to FIG. 1, a hydrogen-generating device 100 includes a first laminate 102, a first substrate 104, and a second substrate 106. The first laminate 102 includes a liquid feed inlet 108 passing through the first laminate 102.

The hydrogen-generating device 100 can further include a second laminate 110 and a third laminate 112, wherein the second laminate 110 is sandwiched between the first substrate 104 and the second substrate 106, and the second substrate 106 is sandwiched between the second laminate 110 and the third laminate 112. The first substrate 104 and the second substrate 106 can be silicon substrates, and the first laminate 102, the second laminate 110, and the third laminate 112 can be glass substrates for packaging and guiding liquid and gas. However, the invention does not limit the materials of the first laminate 102, the first substrate 104, the second laminate 110, the second substrate 106, and the third laminate 112, and those having ordinary skill in the art can select suitable materials as needed. Moreover, the first laminate 102, the second laminate 110, and the third laminate 112 can be bonded to the first substrate 104 and the second substrate 106 via an anode bonding technique.

Referring to both FIG. 1 and FIG. 2, the hydrogen-generating device 100 further includes a heater 114 to provide the desired heat energy to the hydrogen-generating device 100. The heating temperature range of the heater 114 can be 250° C. or less, and in an embodiment, the heating temperature can be 150° C. or less. The heater 114 can be disposed on a second side 106b of the second substrate 106, and the third laminate 112 can cover the heater 114. In other embodiments, the heater 114 can be further disposed on the second laminate 110 such that the heater 114 faces a second side 104b of the first substrate 104, and the third laminate 112 can cover the second side 106b of the second substrate 106. The heater 114 can be a resistance heater and can be powered by a lithium battery. However, the invention does not the type and the location of the heater 114, and those having ordinary skill in the art can select a suitable type and location for the heater as needed.

Figure 3:
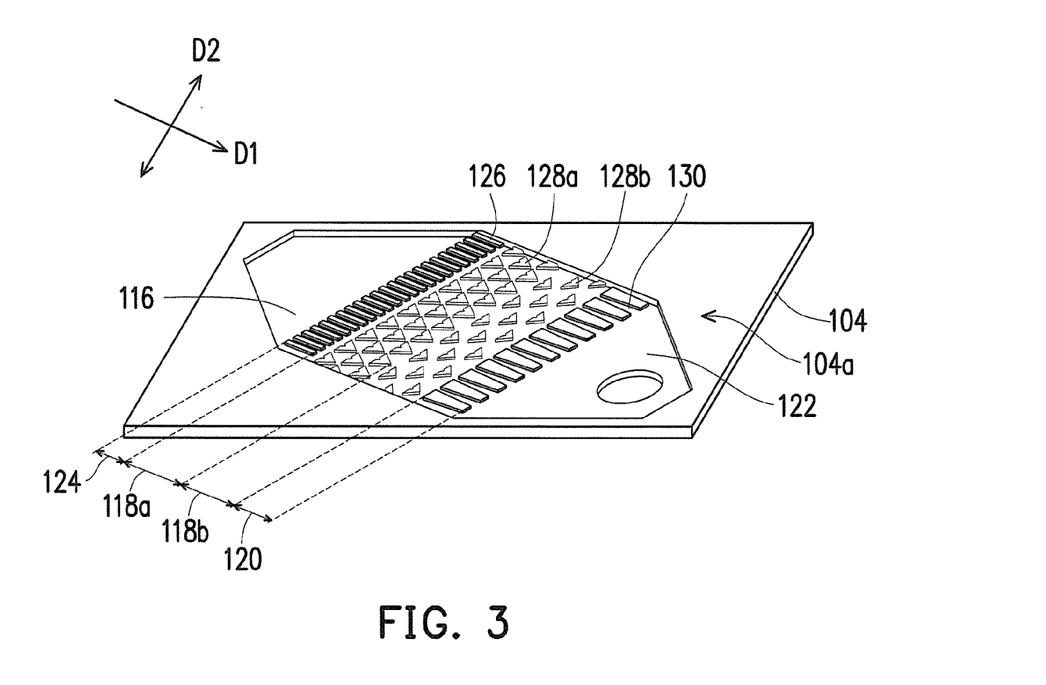
FIG. 3 is an enlarged three-dimensional view of the first side of the first substrate of FIG. 1.
Figure 4:
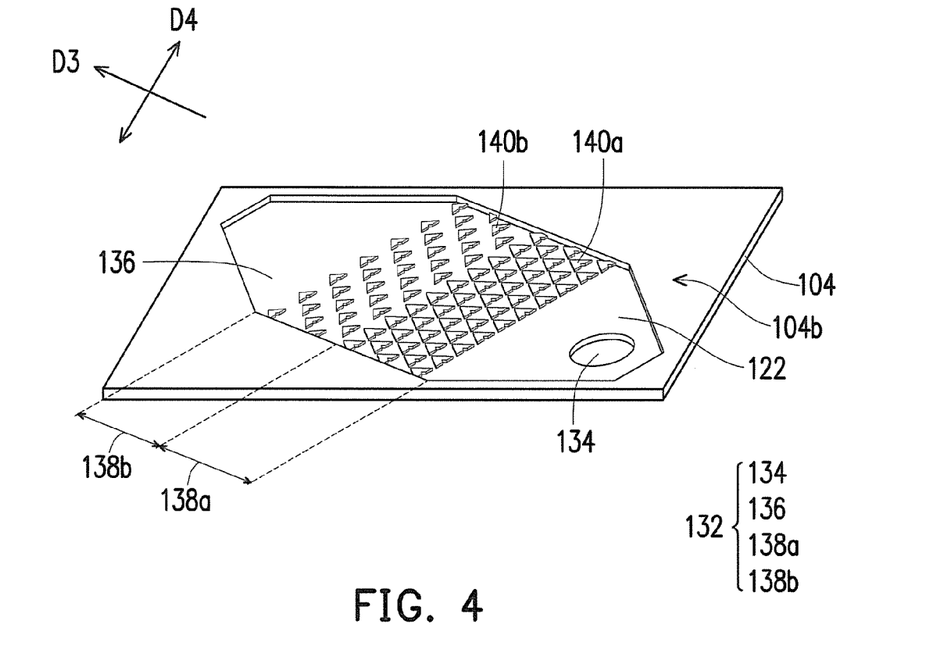
FIG. 4 is an enlarged three-dimensional view of the second side of the first substrate of FIG. 1.

FIG. 3 is an enlarged three-dimensional view of the first side of the first substrate of FIG. 1. FIG. 4 is an enlarged three-dimensional view of the second side of the first substrate of FIG. 1.

Referring to both FIG. 1 and FIG. 3, the first substrate 104 has a first side 104a and a second side 104b opposite to each other, and the first substrate 104 includes a liquid container 116, a first liquid diffusion area 118a, a second liquid diffusion area 118b, a diverging channel area 120, and a first gas container 122 all located at the first side 104a of the first substrate 104. The first liquid diffusion area 118a is located between the liquid container 116 and the first gas container 122, and the second liquid diffusion area 118b is located between the first liquid diffusion area 118a and the first gas container 122. Moreover, the diverging channel area 120 is located between the second liquid diffusion area 118b and the first gas container 122. The first laminate 102 covers the first side 104a of the first substrate 104, and the liquid feed inlet 108 is connected to the liquid container 116. The liquid feed contains a specific ratio of liquid methanol and hydrogen peroxide. For instance, the volume ratio of liquid methanol and hydrogen peroxide in the liquid feed can be between 1:5 and 5:1. Accordingly, the liquid feed containing liquid methanol and hydrogen peroxide having a specific ratio can enter the liquid container 116 from the liquid feed inlet 108.

The first substrate 104 can further include a capillary structure area 124 located between the liquid container 116 and the first liquid diffusion area 118a. A plurality of channels 126 is located in the capillary structure area 124 and extended along a first direction D1 from the liquid container 116 to the first gas container 122. The width of each of the channels 126 can be between 1 μm and 100 μm, but the invention is not limited thereto, and any channel width that can produce capillary force can be used. The liquid feed in the liquid container 116 can enter the first liquid diffusion area 118a toward the first direction D1 from the liquid container 116 to the first gas container 122 via the capillarity phenomenon produced by the liquid feed and the channels 126.

A plurality of first liquid diffusion structures 128a arranged in an array is located in the first liquid diffusion area 118a, and a plurality of second liquid diffusion structures 128b arranged in an array is located in the second liquid diffusion area 118b. By providing heat energy via the heater 114, each of the first liquid diffusion structures 128a and each of the second liquid diffusion structures 128b can be indirectly used as one micro heater. Therefore, the heated area of the liquid feed can be increased, i.e., the heat transfer efficiency of the heater 114 to the liquid feed is increased. In other words, the evaporation efficiency of the evaporation of the liquid feed into methanol gas and oxygen can be increased.

In the second direction D2 staggered with the first direction D1, the spacing between adjacent first liquid diffusion structures 128a can be less than the spacing between adjacent second liquid diffusion structures 128b. The first direction D1 is, for instance, perpendicular to the second direction D2, but the invention is not limited thereto, and those having ordinary skill in the art can adjust the angle between the first direction D1 and the second direction D2 as needed. Since the spacing between the adjacent first liquid diffusion structures 128a is smaller, the flow direction of the liquid feed in the first liquid diffusion area 118a can be further limited by the gap between the first liquid diffusion structures 128a, so as to guide the liquid feed to collectively move toward the first direction D1. Therefore, the liquid feed can be guided to more rapidly pass through the first liquid diffusion area 118a. In comparison, the spacing between the adjacent second liquid diffusion structures 128b is greater, thus facilitating the flow of the liquid feed in the second liquid diffusion area 118b toward the second direction D2. Therefore, the liquid feed can be more uniformly distributed in the second liquid diffusion area 118b, and therefore the heated area of the liquid feed can be increased, such that the evaporation efficiency thereof is increased.

The shape of the first liquid diffusion structures 128a includes v shape, circle, rectangle, or a combination thereof, and the shape of the second liquid diffusion structures 128b also includes v shape, circle, rectangle, or a combination thereof. In the present embodiment, the first liquid diffusion structures 128a and the second liquid diffusion structures 128b are both v-shaped as an example, but the invention is not limited thereto. Except that the spacings in the second direction D2 are different, the aspect ratio of each of the first liquid diffusion structures 128a (i.e., the ratio of the size in the first direction D1 and the size in the second direction D2) can further be greater than the aspect ratio of each of the second liquid diffusion structures 128b. In other words, in the present embodiment, the angle of each of the v-shaped first liquid diffusion structures 128a can be less than the angle of each of the v-shaped second liquid diffusion structures 128b. Accordingly, the length of the gap between the adjacent first liquid diffusion structures 128a extended in the first direction D1 is greater than the length thereof extended in the second direction D2. Therefore, the liquid feed in the first liquid diffusion area 118a can further be guided to flow toward the first direction D1. On the other hand, the length of the gap between the adjacent second liquid diffusion structures 128b extended in the second direction D2 is greater than the length thereof extended in the first direction D1. Therefore, the liquid feed in the second liquid diffusion area 118b can flow toward the second direction D2 more efficiently, and can therefore flow more divergently and be uniformly diffused in the second liquid diffusion area 118b, such that the evaporation efficiency of the liquid feed can be further increased.

On the other hand, in another embodiment, the spacing between the adjacent first liquid diffusion structures 128a in the second direction D2 can also be greater than the spacing between the adjacent second liquid diffusion structures 128b. As a result, the liquid feed in the first liquid diffusion area 118a can be uniformly diffused, and the liquid feed in the second liquid diffusion area 118b can collectively flow toward the first direction D1. Moreover, the aspect ratio of each of the first liquid diffusion structures 128a can further be less than the aspect ratio of each of the second liquid diffusion structures 128b. In other words, in the present embodiment, the angle of each of the v-shaped first liquid diffusion structures 128a can be greater than the angle of each of the v-shaped second liquid diffusion structures 128b. Therefore, the liquid feed in the first liquid diffusion area 118a can flow more divergently and be uniformly diffused in the first liquid diffusion area 118a, and therefore the evaporation efficiency of the liquid feed can be further increased. Moreover, the liquid feed in the second liquid diffusion area 118b can further be guided to flow toward the first direction D1.

In other embodiments, the number of the liquid diffusion area between the liquid container 116 and the first gas container 122 can be greater than 2, and each of the liquid diffusion areas respectively includes a plurality of liquid diffusion structures. The spacing of adjacent liquid diffusion structures in the second direction D2 can be gradually increased toward the first direction D1. Moreover, the aspect ratio of each of the liquid diffusion structures can further be gradually decreased toward the first direction D1. In other words, in the present embodiment, the angle of each of the v-shaped liquid diffusion structures can be gradually increased toward the first direction D1. On the other hand, the spacing of adjacent liquid diffusion structures in the second direction D2 can also be gradually decreased toward the first direction D1. Moreover, the aspect ratio of each of the liquid diffusion structures can further be gradually increased toward the first direction D1. In other words, in the present embodiment, the angle of each of the v-shaped liquid diffusion structures can be gradually decreased toward the first direction D1.

A plurality of diverging channels 130 is located in the diverging channel area 120, and each of the diverging channels 130 is extended and divergent in the first direction D1. The expansion angle of the diverging channels 130 can be between 0.1° and 30°, and in an embodiment, the expansion angle can be 0.5°. A greater expansion angle can better prevent gas evaporated from the liquid feed from reverse flowing and interfering the flow direction of the liquid feed. Accordingly, the evaporation efficiency of the liquid feed can be further increased and methanol gas can be effectively guided to flow toward the first direction D1. However, when the expansion angle is too large (such as greater than 30°), the heated surface area of the liquid feed is smaller, and therefore the issue of reduced evaporation efficiency occurs.

In the first direction D1, the ratio of the total length of the first liquid diffusion area 118a and the second liquid diffusion area 118b and the length of the diverging channel area 120 can be between 0.5 and 2. If the ratio is less than 0.5, then the heated surface area of the liquid feed is reduced such that the evaporation efficiency is reduced, and if the ratio is greater than 2, then the effect of preventing the reverse flow of methanol gas is reduced.

Referring to all of FIG. 1, FIG. 3, and FIG. 4, the first substrate 104 further includes a gas-mixing tank 132. The gas-mixing tank 132 is located at the second side 104b of the first substrate 104. The gas-mixing tank 132 has an inlet 134 and an outlet 136, wherein the inlet 134 is connected to the first gas container 122. The gas-mixing tank 132 can further include a first gas diffusion area 138a and a second gas diffusion area 138b. The first gas diffusion area 138a is located between the inlet 134 and the outlet 136 of the gas-mixing tank 132, wherein a plurality of first gas diffusion structures 140 arranged in an array is located in the first gas diffusion area 138a. The second gas diffusion area 138b is located between the first gas diffusion area 138a and the outlet 136 of the gas-mixing tank 132, wherein a plurality of second gas diffusion structures 140b arranged in an array is located in the second gas diffusion area 138b. The evaporated methanol gas and oxygen flow into the mixing tank 132 together such that the two are mixed in the mixing tank 132.

In the fourth direction D4 staggered with the third direction D3 along the inlet 134 to the outlet 136 of the gas-mixing tank 132 (the third direction D3 is, for instance, opposite to the first direction D1, and the fourth direction D4 is, for instance, the same as the second direction D2), the spacing between adjacent first gas diffusion structures 140a can be less than the spacing between adjacent second gas diffusion structures 140b. Moreover, the aspect ratio of each of the first gas diffusion structures 140a (i.e., the ratio of the size in the third direction D3 and the size in the fourth direction D4) can further be greater than the aspect ratio of each of the second gas diffusion structures 140b. In other words, in the present embodiment, the angle of each of the v-shaped first gas diffusion structures 140a can be less than the angle of each of the v-shaped second gas diffusion structures 140b. Similar to the effect of the first liquid diffusion structures 128a and the second liquid diffusion structures 128b, the flow direction of methanol gas and oxygen in the first gas diffusion area 138a can be limited by the smaller spacing and/or gaps having greater extension lengths between the first gas diffusion structures 140a, such that methanol gas and oxygen are guided to flow collectively toward the third direction D3. In comparison, since the spacing between the adjacent second gas diffusion structures 140b is greater and/or the length of gap extension between the adjacent second gas diffusion structures 140b is shorter, the flow direction of methanol gas and oxygen in the second gas diffusion area 138b is less limited and methanol gas and oxygen can be more uniformly distributed in the second gas diffusion area 138b, such that the heated area of methanol gas and oxygen is increased.

On the other hand, in another embodiment, the spacing between the adjacent first gas diffusion structures 140a in the fourth direction D4 can also be greater than the spacing between the adjacent second gas diffusion structures 140b. Moreover, the aspect ratio of each of the first gas diffusion structures 140a can further be less than the aspect ratio of each of the second gas diffusion structures 140b. In other words, in the present embodiment, the angle of each of the v-shaped first gas diffusion structures 140a can be greater than the angle of each of the v-shaped second gas diffusion structures 140b. As a result, methanol gas and oxygen in the first gas diffusion area 138a can be uniformly diffused, and methanol gas and oxygen in the second gas diffusion area 138b can collectively flow toward the third direction D3.

In other embodiments, the number of gas diffusion areas between the inlet 134 and the outlet 136 of the gas-mixing tank 132 can be greater than 2. The spacing of adjacent gas diffusion structures in the fourth direction D4 can be gradually increased toward the third direction D3. Moreover, the aspect ratio of each of the gas diffusion structures can further be gradually decreased toward the third direction D3. In other words, in the present embodiment, the angle of each of the v-shaped gas diffusion structures can be gradually increased toward the third direction D3. On the other hand, the spacing of adjacent gas diffusion structures in the fourth direction D4 can also be gradually decreased toward the third direction D3. Moreover, the aspect ratio of each of the gas diffusion structures can further be gradually increased toward the third direction D3. In other words, in the present embodiment, the angle of each of the v-shaped gas diffusion structures can be gradually decreased toward the third direction D3.

Referring to both FIG. 1 and FIG. 4, the hydrogen-generating device 100 can further include a second laminate 110, and the second laminate 110 is located between the gas-mixing tank 132 and the second substrate 106, wherein the second laminate 110 includes a gas through-hole 142 passing through the second laminate 110. The gas through-hole 142 is connected to the outlet 136 of the gas-mixing tank 132.

Figure 5:
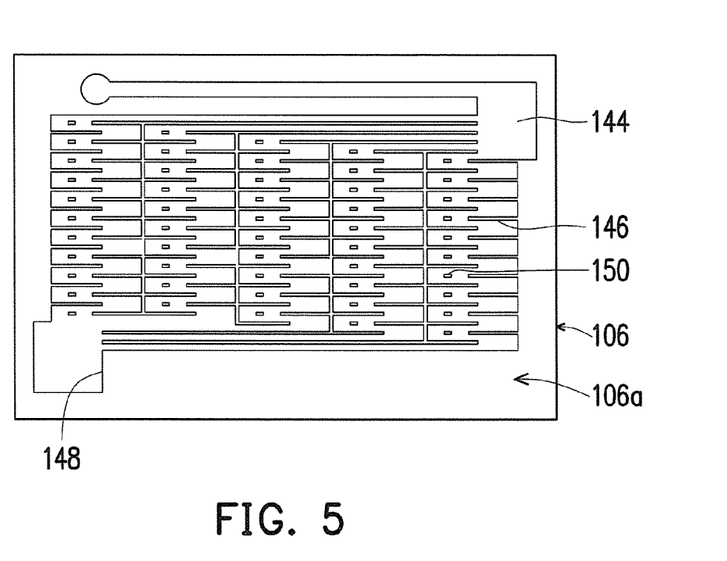
FIG. 5 is an enlarged top view of the first side of the second substrate of FIG. 1.

FIG. 5 is an enlarged top view of the first side of the second substrate of FIG. 1.

Referring to all of FIG. 1, FIG. 4, and FIG. 5, the second substrate 106 has a first side 106a and a second side 106b opposite to each other, wherein the first side 106a of the second substrate 106 covers the second side 104b of the first substrate 104. The second substrate 106 includes a second gas container 144 and a gas reaction channel 146 both located at the first side 106a of the second substrate 106. Moreover, the second substrate 106 can further include a third gas container 148 also located at the first side 106a of the second substrate 106. The second gas container 144 can be connected to the outlet 136 of the gas-mixing tank 132 via the gas through-hole 142. Accordingly, oxygen and methanol gas sufficiently mixed in the gas-mixing tank 132 can flow to the second gas container 144 via the gas through-hole 142.

In the present embodiment, the gas-mixing tank 132 is connected to the first gas container 122. In other words, the second gas container 144 is indirectly connected to the first gas container 122. In other embodiments, the hydrogen-generating device 100 may not include the gas-mixing tank 132 and the second laminate 110, and the location of the gas through-hole 142 can be changed at this point such that the second gas container 144 is directly connected to the first gas container 122.

The inlet of the gas reaction channel 146 is connected to the second gas container 144, and a catalyst (not shown) is disposed in the gas reaction channel 146. Moreover, the outlet of the gas reaction channel 146 is connected to the third gas container 148. Accordingly, the gas mixture of oxygen and methanol gas in the second gas container 144 can flow into the gas reaction channel 146 and react in the gas reaction channel 146 having a catalyst to produce hydrogen. Hydrogen produced by the reaction can flow to the outlet of the gas reaction channel 146 along the gas reaction channel 146 and enter the third gas container 148. The heater 114 can control the temperature of the gas reaction channel 146 to 250° C. or less. In an embodiment, the temperature of the gas reaction channel 146 can be 150° C. or less. The catalyst is, for instance, a copper-manganese-zinc catalyst, a copper-based catalyst, or other catalyst materials suitable for reacting methanol and oxygen.

The depth of the gas reaction channel 146 can be between 100 μm and 1000 μm. The gas reaction channel 146 can be zigzagged and have columnar structures 150 at the bends. The distance between the columnar structures 150 and the sidewall of the gas reaction channel 146 can be between 50 μm and 5000 μm. The zigzagged gas reaction channel 146 can increase the specific surface area of the gas reaction channel 146, i.e., the amount of catalyst in the gas reaction channel 146 can be increased to increase the contact area of methanol gas and oxygen with the catalyst. As a result, the conversion rate of methanol is increased. Moreover, the zigzagged gas reaction channel 146 can provide a longitudinal flow field, and the columnar structures 150 located at the bends can further provide a transverse flow field, such that methanol gas and oxygen can be sufficiently reacted in a catalyst environment. However, those having ordinary skill in the art can adjust the size and shape of the gas reaction channel 146 as needed, and the invention is not limited thereto.

The hydrogen-generating device 100 can further include a hydrogen outlet 152. The hydrogen outlet 152 is connected to the third gas container 148 and passes through the second substrate 106, the second laminate 110, the first substrate 104, and the first laminate 102. Accordingly, hydrogen produced by the reaction can be guided out of the hydrogen-generating device 100 via the hydrogen outlet 152 to collect the hydrogen produced by the reaction. Accordingly, the hydrogen-generating device 100 can be used with a fuel cell and the hydrogen produced by the hydrogen-generating device 100 can be used as a feed for the fuel cell. Moreover, the fuel cell can be further applied in the power supply of an electronic product.

In the above embodiments, the components in the first substrate 104 and the second substrate 106 are made by lithography and etching processes, and therefore the components are formed in the first substrate 104 and the second substrate 106 and are a part of the first substrate 104 and the second substrate 106. However, in other embodiments, additional layers can also be formed on the first substrate 104 and the second substrate 106 and a patterning process is performed on the layers to form the components, but the invention is not limited thereto. Moreover, since the critical dimensions of the structures made by known lithography, etching, and/or patterning processes in the art can reach micrometers or less, the critical dimensions of the components in the first substrate 104 and the second substrate 106 can also reach the same size. Accordingly, the overall size of the hydrogen-generating device 100 can reach, for instance, a length of 2 cm, a width of 2 cm, and a height of 0.23 cm or smaller, and can be considered as a micro hydrogen-generating device. Since the size of the hydrogen-generating device 100 is small, the hydrogen-generating device 100 can be better applied in power supplies having a small size and/or a portable electronic product.

Based on the above, in the hydrogen-generating device of the invention, each of the liquid diffusion structures in the liquid diffusion area can be indirectly used as one micro heater, and therefore the heated area of the liquid feed can be increased. Therefore, the heat transfer efficiency of the heater to the liquid feed can be increased, and as a result the evaporation efficiency of the liquid feed can be increased. Moreover, via the diverging channels, interference to the flow of the liquid feed due to the reverse flow of gas evaporated from the liquid feed can be prevented. Accordingly, the evaporation efficiency of the liquid feed can be further increased and methanol gas and oxygen can be effectively guided into the subsequent gas reaction channel for a hydrogen-generating reaction.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A hydrogen-generating device, comprising:
    a first substrate having a first side and a second side opposite to each other, wherein the first substrate comprises:
        a liquid container located at the first side of the first substrate;
        a first gas container located at the first side of the first substrate;
        a first liquid diffusion area located between the liquid container and the first gas container, wherein a plurality of first liquid diffusion structures arranged in an array is located in the first liquid diffusion area;
        a second liquid diffusion area located between the first liquid diffusion area and the first gas container, wherein a plurality of second liquid diffusion structures arranged in an array is located in the second liquid diffusion area; and
        a diverging channel area located between the second liquid diffusion area and the first gas container, wherein a plurality of diverging channels is located in the diverging channel area, and each of the diverging channels is extended and diverged in a first direction from the liquid container to the first gas container;
    a first laminate covering the first side of the first substrate, wherein the first laminate comprises a liquid feed inlet passing through the first laminate, wherein the liquid feed inlet is connected to the liquid container;
    a second substrate having a first side and a second side opposite to each other, wherein the first side of the second substrate covers the second side of the first substrate, and the second substrate comprises:
        a second gas container located at the first side of the second substrate and connected to the first gas container; and
        a gas reaction channel located at the first side of the second substrate, wherein an inlet of the gas reaction channel is connected to the second gas container, and a catalyst is disposed in the gas reaction channel; and
    a heater.

2. The hydrogen-generating device of claim 1, wherein the first substrate further comprises a capillary structure area located between the liquid container and the first liquid diffusion area, wherein a plurality of channels is located in the capillary structure area and extended along the first direction.

3. The hydrogen-generating device of claim 2, wherein a width of each of the channels is between 1 μm and 100 μm.

4. The hydrogen-generating device of claim 1, wherein in a second direction staggered with the first direction, a spacing between adjacent first liquid diffusion structures is greater than or less than a spacing between adjacent second liquid diffusion structures.

5. The hydrogen-generating device of claim 1, wherein a shape of the plurality of first liquid diffusion structures in the first liquid diffusion area comprises a v shape, a circle, a rectangle, or a combination thereof.

6. The hydrogen-generating device of claim 1, wherein a shape of the plurality of second liquid diffusion structures in the second liquid diffusion area comprises a v shape, a circle, a rectangle, or a combination thereof.

7. The hydrogen-generating device of claim 1, wherein an expansion angle of the diverging channels is between 0.1° and 30°.

8. The hydrogen-generating device of claim 1, wherein in the first direction, a ratio of a total length of the first liquid diffusion area and the second liquid diffusion area and a length of the diverging channel area is between 0.5 and 2.

9. The hydrogen-generating device of claim 1, wherein the first substrate further comprises a gas-mixing tank and the gas-mixing tank is located at the second side of the first substrate, wherein an inlet of the gas-mixing tank is connected to the first gas container and an outlet of the gas-mixing tank is connected to the second gas container.

10. The hydrogen-generating device of claim 9, wherein the gas-mixing tank further comprises:
   a first gas diffusion area located between the inlet and the outlet of the gas-mixing tank, wherein a plurality of first gas diffusion structures arranged in an array is located in the first gas diffusion area; and
   a second gas diffusion area located between the first gas diffusion area and the outlet of the gas-mixing tank, wherein a plurality of second gas diffusion structures arranged in an array is located in the second gas diffusion area.

11. The hydrogen-generating device of claim 10, wherein a spacing between adjacent first gas diffusion structures is greater than or less than a spacing between adjacent second gas diffusion structures in a fourth direction staggered with the third direction along the inlet to the outlet of the gas-mixing tank.

12. The hydrogen-generating device of claim 9, further comprising a second laminate, wherein the second laminate is located between the gas-mixing tank and the second substrate, wherein the second laminate comprises a gas through-hole passing through the second laminate, and the gas through-hole is connected to the second gas container.

13. The hydrogen-generating device of claim 1, wherein a depth of the gas reaction channel is between 100 μm and 1000 μm.

14. The hydrogen-generating device of claim 1, wherein the gas reaction channel is zigzagged and has a columnar structure at a bend.

15. The hydrogen-generating device of claim 14, wherein a distance between the columnar structure and a sidewall of the gas reaction channel is between 50 μm and 5000 μm.

16. The hydrogen-generating device of claim 1, wherein the heater is disposed on the second side of the second substrate.

17. The hydrogen-generating device of claim 16, further comprising a third laminate, wherein the third laminate covers the heater.

* * * * *